(12) United States Patent
Karns et al.

(10) Patent No.: US 11,930,802 B2
(45) Date of Patent: Mar. 19, 2024

(54) TOWABLE LIVE WELL DEVICE

(71) Applicants: Calvin Karns, Altamont, IL (US); Larry Karns, Altamont, IL (US)

(72) Inventors: Calvin Karns, Altamont, IL (US); Larry Karns, Altamont, IL (US)

(*) Notice: Subject to any disclaimer, the term of this patent is extended or adjusted under 35 U.S.C. 154(b) by 22 days.

(21) Appl. No.: 17/874,018

(22) Filed: Jul. 26, 2022

(65) Prior Publication Data

US 2024/0032523 A1  Feb. 1, 2024

(51) Int. Cl.
*A01K 97/20* (2006.01)

(52) U.S. Cl.
CPC .................. *A01K 97/20* (2013.01)

(58) Field of Classification Search
CPC ........ A01K 97/20; A01K 97/05; A01K 65/00; A01K 63/02; A01K 71/00; B63B 35/00
USPC .............................. 43/55; 119/203
See application file for complete search history.

(56) References Cited

U.S. PATENT DOCUMENTS

| | | | | |
|---|---|---|---|---|
| 521,244 A * | 6/1894 | Muncaster | ............. | A01K 97/05 43/56 |
| 620,805 A * | 3/1899 | Russ | ...................... | A01K 97/04 43/55 |
| 1,576,688 A * | 3/1926 | Thompson | ............. | A01K 97/04 43/55 |
| 1,630,131 A * | 5/1927 | Messinger | ............. | A01K 97/05 43/56 |
| 2,001,468 A * | 5/1935 | Moutoux | ............... | A01K 97/05 43/55 |
| 2,111,959 A * | 3/1938 | Baxter | ................... | A01K 97/05 43/56 |
| 2,149,996 A * | 3/1939 | Gulden | .................. | A01K 97/05 43/56 |
| 2,629,201 A * | 2/1953 | Runkle | .................. | A01K 97/05 43/56 |
| 2,657,496 A * | 11/1953 | Lee Spotswood | ..... | A01K 97/05 43/55 |
| 3,304,645 A * | 2/1967 | Hardesty | ............... | A01K 97/05 43/55 |
| 3,367,061 A * | 2/1968 | Primmer | ............... | A01K 63/02 43/55 |
| 4,297,804 A * | 11/1981 | Weld | ...................... | A01K 97/05 43/56 |
| 4,638,593 A * | 1/1987 | Garcia | .................. | A01K 97/05 43/56 |
| 4,642,934 A | 2/1987 | Carlson | | |

(Continued)

FOREIGN PATENT DOCUMENTS

WO    WO2019169437    9/2019

*Primary Examiner* — Joshua D Huson
*Assistant Examiner* — Brook Victoria Schmid

(57) ABSTRACT

A towable live well device for storing fish in a floating live well towed behind a vessel includes a container which tapers from a rear end to a tow end and defines an interior space. A rear edge of a perimeter wall of the container defines an opening to the interior space. A porous rear wall extends across the opening and is configured for permitting a water through the opening and containing a fish in the interior space. A container door opens and closes a container aperture for placing the fish into the interior space. A flotation member is coupled to the container and has a density such that it is configured to float the device. A tow bracket is coupled to the container and is configured for securely tying to a tow line for towing the device by a vessel.

18 Claims, 7 Drawing Sheets

(56) References Cited

U.S. PATENT DOCUMENTS

| | | | | |
|---|---|---|---|---|
| 4,794,723 | A | * | 1/1989 | Arnold .................... A01K 97/04 43/56 |
| 4,996,790 | A | * | 3/1991 | Ruggles ................. A01K 97/05 43/55 |
| 5,165,198 | A | | 11/1992 | Kilian, III |
| 5,551,186 | A | * | 9/1996 | Harada ................... A01K 97/20 224/920 |
| 6,032,404 | A | * | 3/2000 | Cincibus ................ A01K 97/05 206/315.11 |
| 6,354,238 | B1 | | 3/2002 | Molesworth |
| 6,810,617 | B1 | | 11/2004 | Burroughs |
| 9,560,842 | B2 | * | 2/2017 | Athey .................... A01K 97/05 |
| 10,624,328 | B1 | * | 4/2020 | Avery .................... A01K 63/02 |
| 2005/0279014 | A1 | * | 12/2005 | Beech .................... A01K 97/05 43/44.99 |
| 2007/0012236 | A1 | * | 1/2007 | Caples ................... B63B 34/20 114/347 |
| 2014/0360090 | A1 | * | 12/2014 | Nickolas ................ A01K 97/05 29/428 |
| 2018/0153149 | A1 | * | 6/2018 | Beach .................... A01K 97/05 |

\* cited by examiner

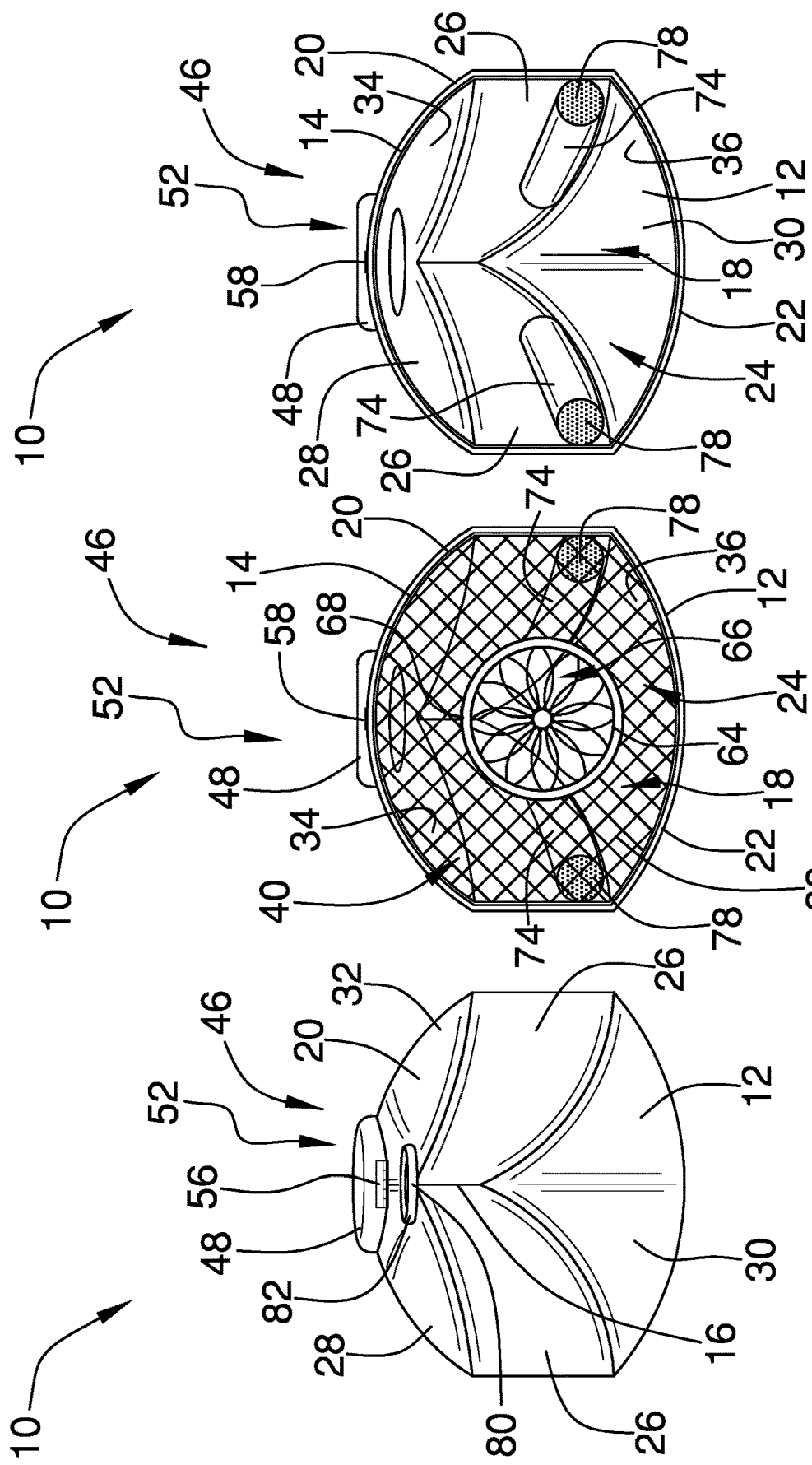

TOWABLE LIVE WELL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to live wells and more particularly pertains to a new live well for storing fish in a floating live well towed behind a vessel.

(2) Description of Related Art Including Information Disclosed Under 37 CFR 1.97 and 1.98

The prior art relates to live wells, some of which are attached or attachable to a vessel. This includes one device which holds bait in a tank that is mountable within the hull of a kayak. However, the prior art does not disclose a live well which is towable behind a vessel such as a kayak and floats atop the water.

BRIEF SUMMARY OF THE INVENTION

An embodiment of the disclosure meets the needs presented above by generally comprising a container which tapers from a rear end to a tow end and defines an interior space. A rear edge of a perimeter wall of the container defines an opening to the interior space. A porous rear wall extends across the opening and is configured for permitting a water through the opening and containing a fish in the interior space. A container door opens and closes a container aperture for placing the fish into the interior space. A flotation member is coupled to the container and has a density such that it is configured to float the device. A tow bracket is coupled to the container and is configured for securely tying to a tow line for towing the device by a vessel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a front view of an embodiment of the disclosure.

FIG. 6 is a rear view of an embodiment of the disclosure.

FIG. 7 is a rear view of an embodiment of the disclosure with a rear wall removed.

DETAILED DESCRIPTION OF THE INVENTION

Figure 1:
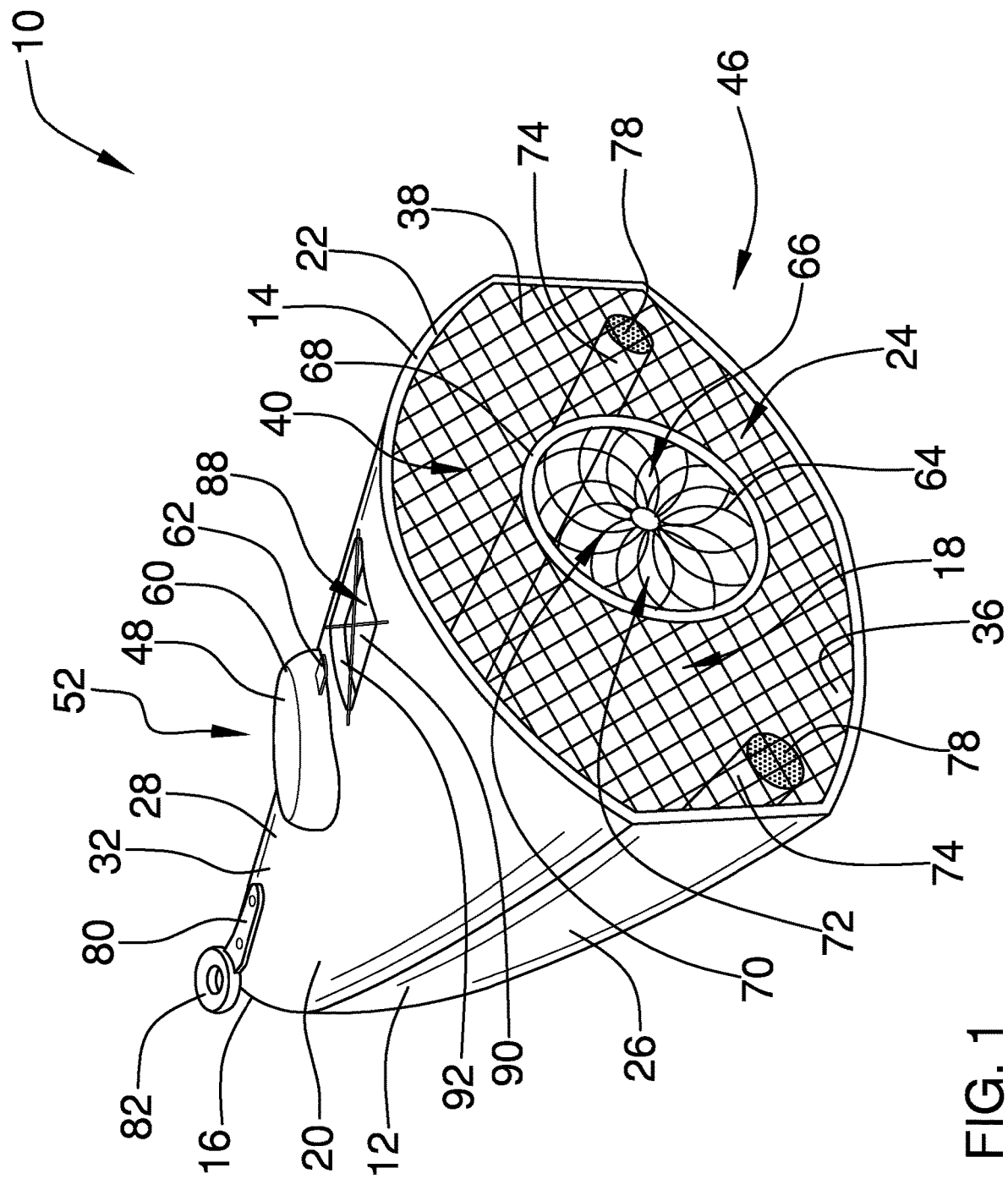
FIG. 1 is a top rear side perspective view of a towable live well device according to an embodiment of the disclosure.
Figure 2:
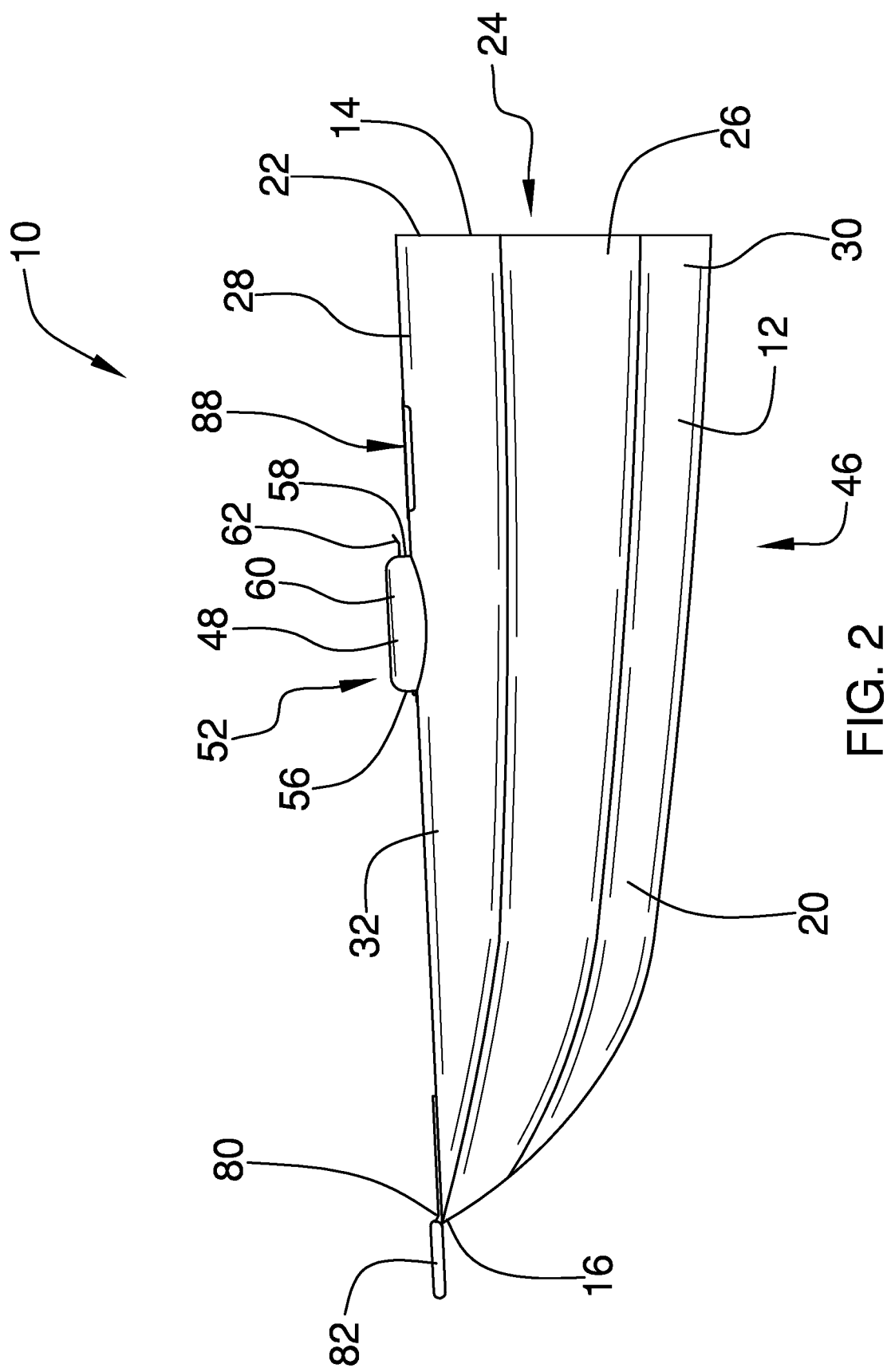
FIG. 2 is a side view of an embodiment of the disclosure.
Figure 3:
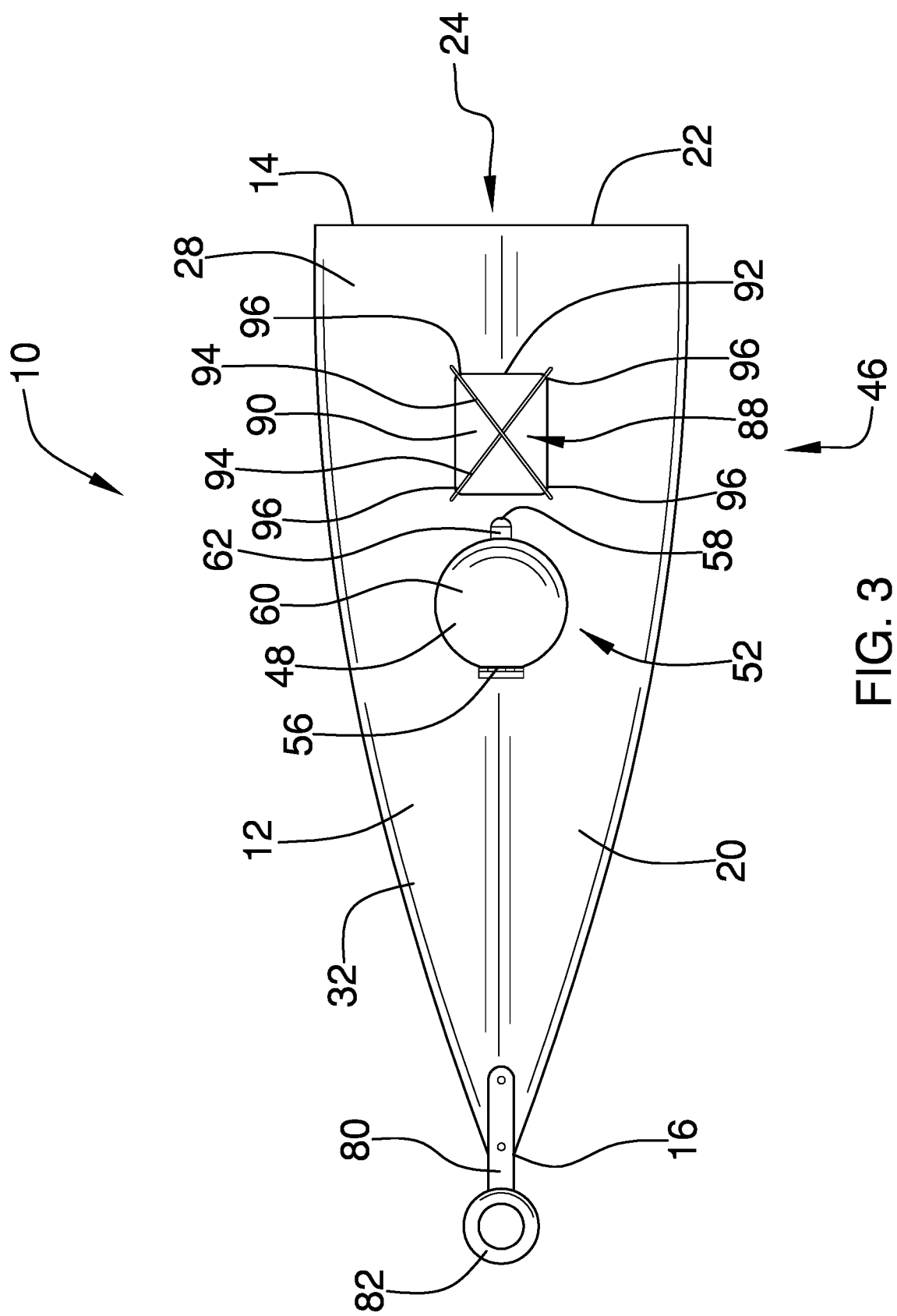
FIG. 3 is a top view of an embodiment of the disclosure.
Figure 4:
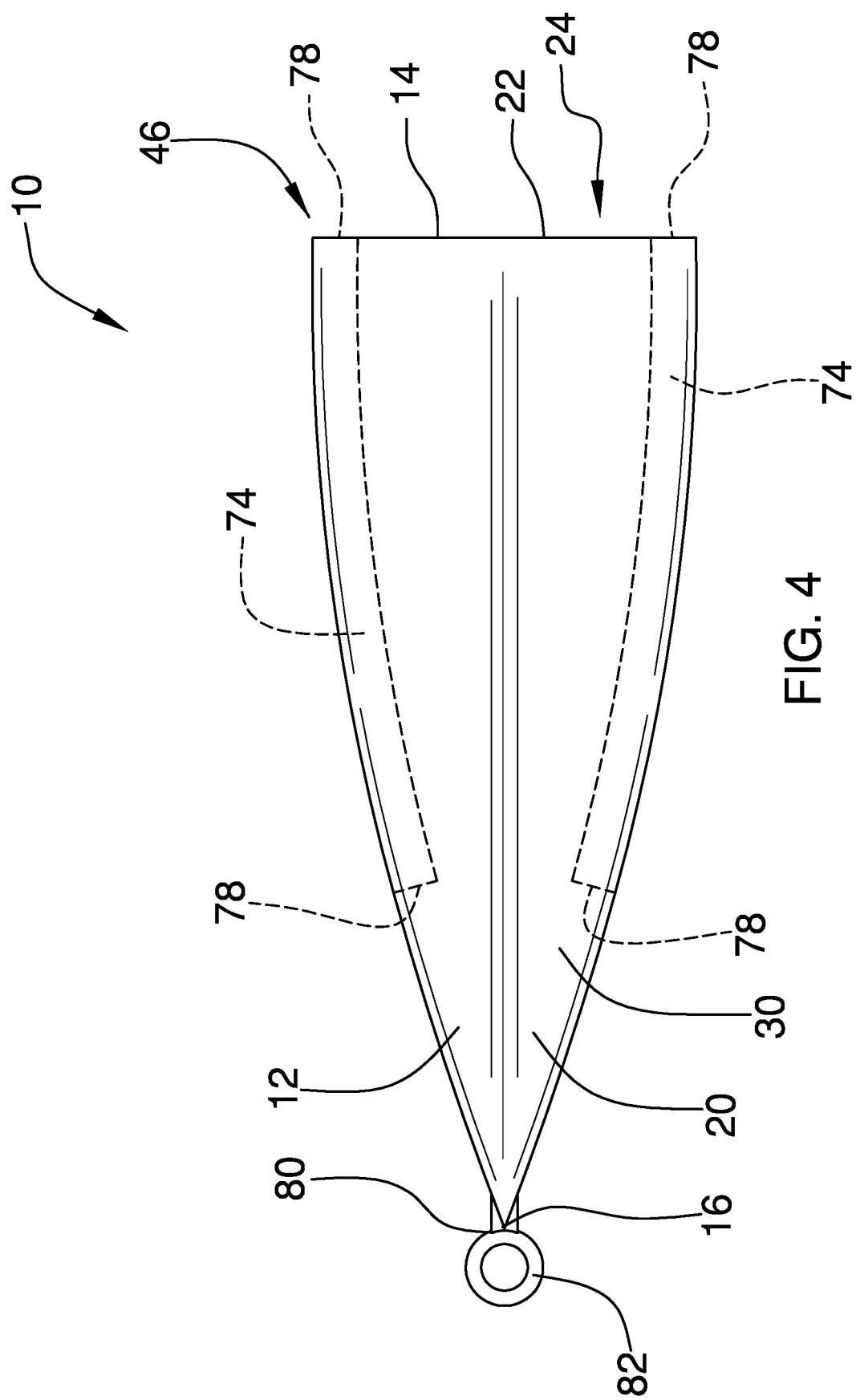
FIG. 4 is a bottom view of an embodiment of the disclosure.
Figure 8:
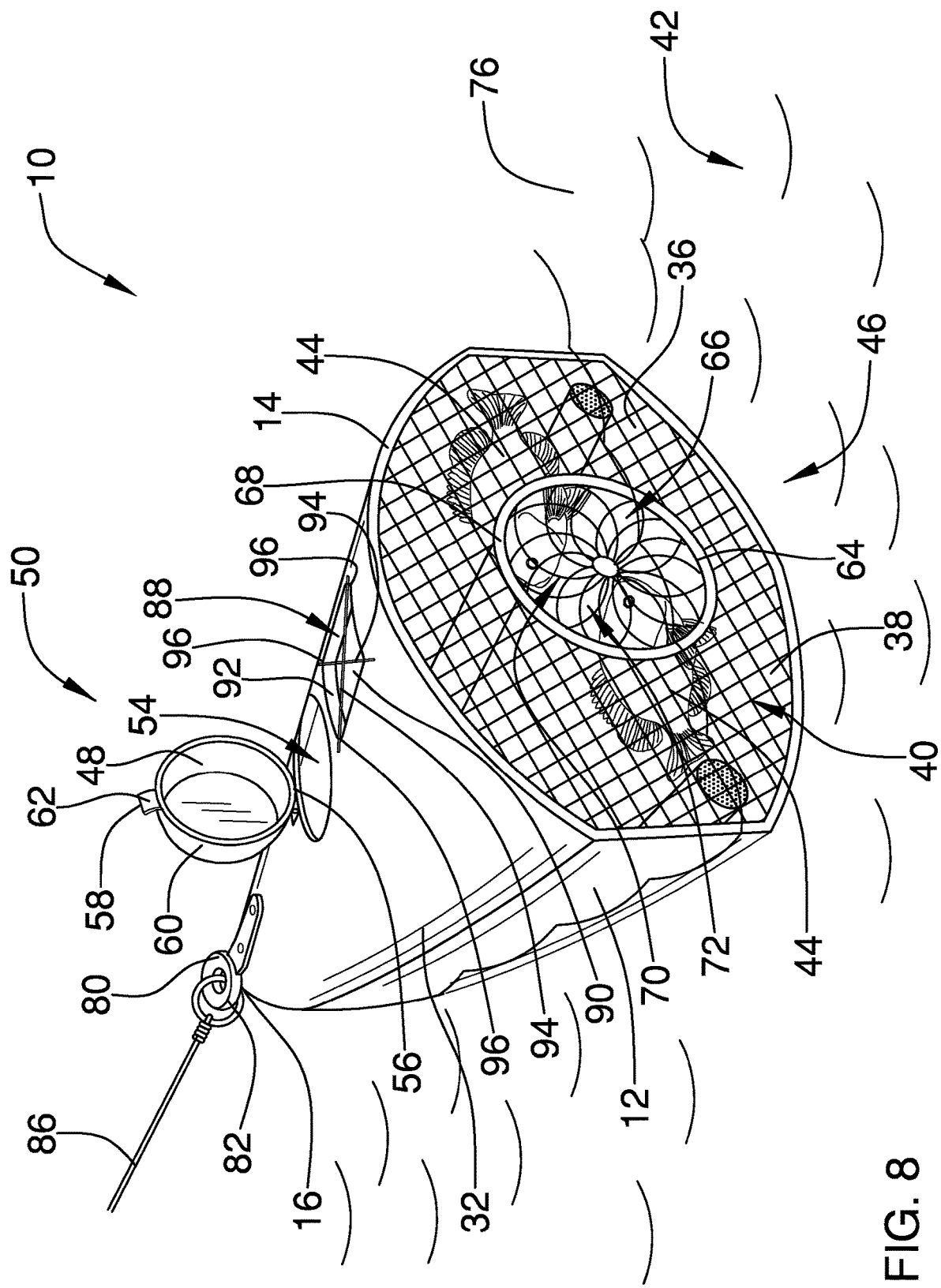
FIG. 8 is an in-use view of an embodiment of the disclosure.
Figure 9:
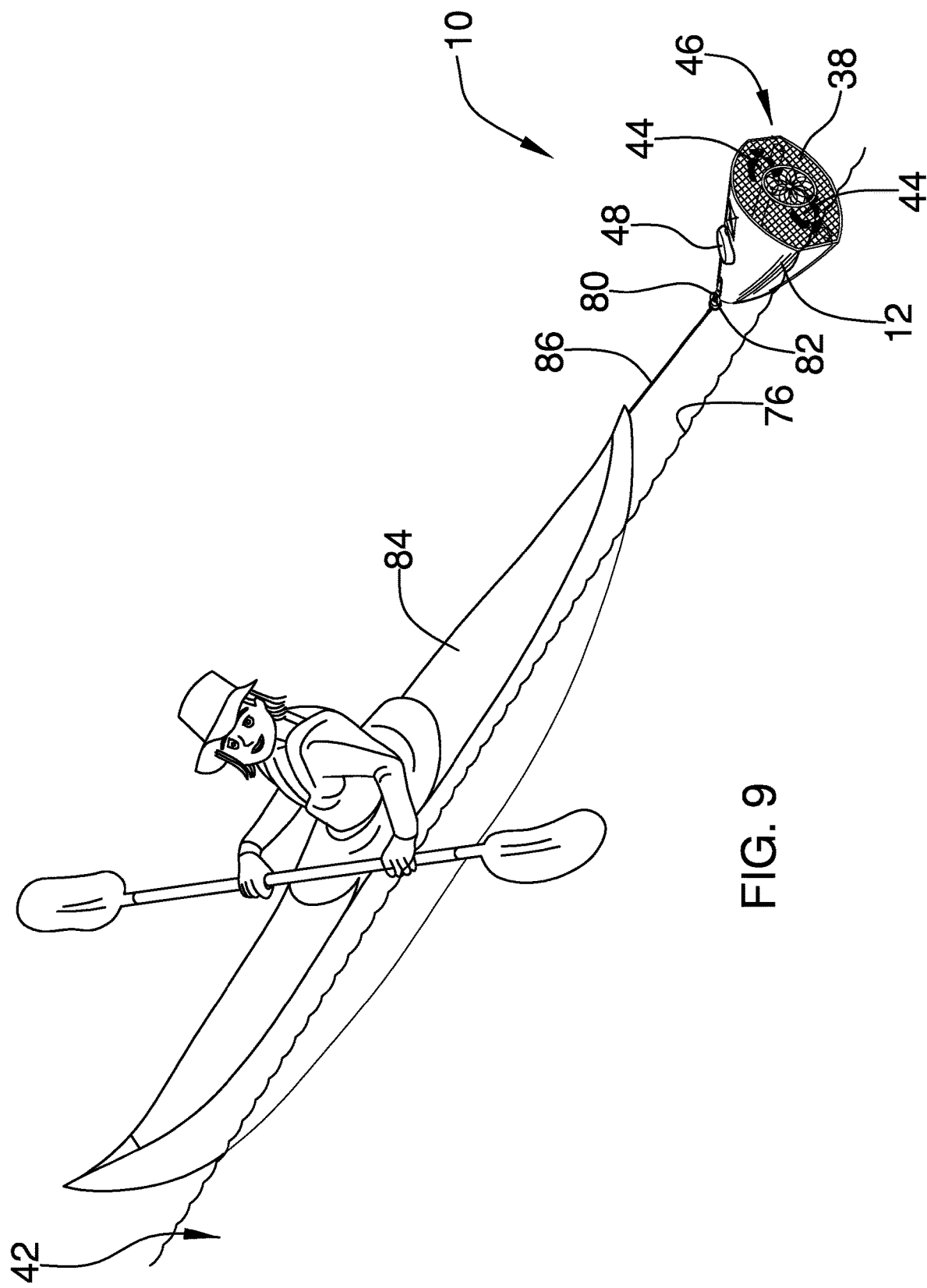
FIG. 9 is an in-use view of an embodiment of the disclosure.

With reference now to the drawings, and in particular to FIGS. 1 through 9 thereof, a new live well embodying the principles and concepts of an embodiment of the disclosure and generally designated by the reference numeral 10 will be described.

As best illustrated in FIGS. 1 through 9, the towable live well device 10 generally comprises a container 12 constructed of a water-impermeable material. The container 12 has a perimeter wall 20 which tapers from a rear end 14 to a tow end 16, defining an interior space 18. The perimeter wall 20 has a rear edge 22 defining an opening 24 to the interior space 18 at the rear end 14. The perimeter wall 20 has a pair of lateral portions 26 which each extending from the rear end 14 to the tow end 16. The perimeter wall 20 also has a top portion 28 and a bottom portion 30, each of which extend from the rear end 14 to the tow end 16 and between the pair of lateral portions 26.

The top portion 28 has an outer surface 32 facing away from the interior space 18. Each of the top portion 28 and the bottom portion 30 is arcuate. Each of an interior surface 34 of the top portion 28 and a interior surface 36 of the bottom portion 30 is concave and faces the interior space 18. Each lateral portion 26 is vertical. A rear wall 38 extends across the opening 24 and is formed of a plurality of meshed rear wall wires 40. The rear wall 38 is configured for permitting a quantity of a water 42 moving through the opening 24 and for containing a fish 44 in the interior space 18. The rear wall 38 and the container 12 cooperatively define a live well 46.

A container door 48 is coupled to the top portion 28 of the perimeter wall 20. The container door 48 has an open position 50 and a closed position 52 and covers a container aperture 54 when closed. The container door 48 is openable away from the top portion 28 and is spring-biased in the closed position 52 of the container door 48. The container door 48 is configured for preventing the fish 44 from moving through the container aperture 54 when closed. The container door 48 is pivotably coupled at a front end 56 of the container door 48, wherein the front end 56 faces the tow end 16 of the container 12. The container door 48 has a back end 58 opposite the front end 56 of the container door 48. The container door 48 has a circular main portion 60 and a handle portion 62 extending from the main portion 60 to the back end 58 of the container door 48. The container door 48 is centered between the lateral portions 26 of the perimeter wall 20.

A rear door 64 is coupled to the rear wall 38 and has an open position and a closed position. The rear door 64 covers a rear aperture 66 when closed and is spring-biased in the closed position of the rear door 64. The rear door 64 is configured for preventing the fish 44 from moving through the rear aperture 66 when closed. The rear door 64 is openable into the interior space 18 and is pivotably coupled at a top end 68 of the rear door 64, wherein the top end 68 of the rear door 64 faces the top portion 28 of the container 12. The rear door 64 is centered between the pair of lateral portions 26 and between the top portion 28 and the bottom portion 30. The rear door 64 is formed of a plurality of meshed rear door wires 70 which defines a plurality of rear door apertures 72. The rear door 64 is configured for permitting water 42 moving through the plurality of rear door apertures 72.

A pair of flotation members 74 having a density less than a density of the water 42 is coupled to the container 12 and is configured for floating the live well 46 proximate a top side 76 of the water 42. Each flotation member 74 has a pair of ends 78, and each flotation member 74 is elongate between the pair of ends 78 of an associated flotation member 74 of the pair of flotation members 74. Each flotation member 74 is also cylindrical. Each flotation member 74 is positioned adjacent to an associated lateral portion 26 of the perimeter wall 20 and the rear end 14 of the container 12.

A tow bracket 80 is coupled to the top portion 28 of the perimeter wall 20 at the tow end 16 of the container 12, extending away from the tow end 16. The tow bracket 80 has an annular portion 82 and is configured for coupling to a vessel 84 for towing of the live well 46 by the vessel 84 by threading a tow line 86 coupled to the vessel 84 through the annular portion 82 and securely tying the tow line 86 to the tow bracket 80.

A storage compartment 88 extends into the outer surface 32 of the top portion 28 of the perimeter wall 20, defining a recessed surface 90 and a perimeter surface 92. The storage compartment 88 is rectangular and is positioned between the container door 48 and the rear end 14 of the container 12. The storage compartment 88 is centered between the pair of lateral portions 26 of the perimeter wall 20. The storage compartment 88 is configured for holding an item. A pair of straps 94 is coupled to the top portion 28 of the perimeter wall 20. Each strap 94 extends across the storage compartment 88 between an associated pair of opposing corners 96 of a plurality of corners 96 of the storage compartment 88. Each strap 94 is elastic and is configured for elastically stretching across the item when the item is held within the storage compartment 88, thereby securing the item within the storage compartment 88.

In use, the vessel 84, which may be a kayak, secures to the tow bracket 80 by tying the tow line 86 to the tow bracket 80 so that the device 10 may be towed behind the vessel 84. The pair of flotation members 74 keep the device 10 afloat, and the tapered shape of the container 12 limits a drag force when being towed by the vessel 84. When the fish 44 is caught, it is placed into the live well 46, either by opening the container door 48 and moving the fish 44 through the container aperture 54 or by opening the rear door 64 and moving the fish 44 through the rear aperture 66. If needed, the device 10 can be pulled closer to the vessel 84 by pulling on the tow line 86. The water 42 is permitted to enter the interior space 18 of the live well 46 through the opening 24, thereby creating an environment wherein the fish 44 will stay alive for a period of time. The item can be stored in the storage compartment 88 and secured by placing the elastic straps 94 over the item.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A towable live well device comprising:
 a container, said container tapering from a rear end to a tow end, said container having a perimeter wall extending from said rear end to said tow end, said container defining an interior space, said perimeter wall having a rear edge defining an opening to said interior space at said rear end, said container being constructed of a water-impermeable material wherein said container prevents water from entering said interior space through said perimeter wall;
 a rear wall, said rear wall extending across said opening, said rear wall being porous, said rear wall being configured for permitting a water through said opening, said rear wall being configured for containing a fish in said interior space, said rear wall and said container cooperatively defining a live well;
 a container door, said container door being coupled to said container, said container door being movable between an open position and a closed position, said container door covering a container aperture when closed, said container door being configured for preventing the fish from moving through said container aperture when closed;
 a flotation member, said flotation member being coupled to said container, said flotation member having a density less than a density of the water, said flotation member being configured for floating said live well proximate a top side of the water; and a tow bracket, said tow bracket being coupled to said live well, said tow bracket being configured for coupling to a vessel for towing of said live well by the vessel, a rear door, said rear door being coupled to said rear wall, said rear door covering a rear aperture when closed, said rear door being configured for preventing the fish from moving through said rear aperture when closed.

2. The device of claim 1, further comprising said perimeter wall of said container having a pair of lateral portions, each said lateral portion extending from said rear end to said tow end, said perimeter wall having a top portion and a bottom portion, each of said top portion and said bottom portion extending from said rear end to said tow end and between said pair of lateral portions, said top portion having an outer surface facing away from said interior space.

3. The device of claim 2, further comprising each of said top portion and said bottom portion being arcuate, each of said top portion and said bottom portion having an interior surface facing said interior space, each said interior surface being concave, each said lateral portion being vertical.

4. The device of claim 2, further comprising said container door being coupled to said top portion of said perimeter wall.

5. The device of claim 4, further comprising said container door being centered between said lateral portions of said perimeter wall.

6. The device of claim 4, further comprising said container door being pivotably coupled at a front end of said container door, said front end facing said tow end of said container.

7. The device of claim 6, further comprising said container door being openable away from said container, said container door having a main portion and a handle portion extending from said main portion, said main portion being circular.

8. The device of claim 2, further comprising said tow bracket being coupled to said top portion of said perimeter wall at said tow end of said container, said tow bracket extending away from said tow end, said tow bracket having an annular portion, said tow bracket being configured for coupling to a vessel for towing of said live well by the vessel by threading a tow line coupled to the vessel through said annular portion and securely tying the tow line to said tow bracket.

9. The device of claim 2, further comprising a storage compartment, said storage compartment extending into said outer surface of said top portion of said perimeter wall, said storage compartment defining a recessed surface and a perimeter surface, said storage compartment being positioned between said container door and said rear end of said container, said storage compartment being rectangular, said storage compartment being centered between said pair of lateral portions of said perimeter wall, said storage compartment being configured for holding an item.

10. The device of claim 9, further comprising a pair of straps, said pair of straps being coupled to said top portion of said perimeter wall, each said strap extending across said storage compartment between an associated pair of opposing corners of a plurality of corners of said storage compartment, each said strap being elastic, said pair of straps being configured for elastically stretching across the item when the item is held within said storage compartment, thereby securing the item within said storage compartment.

11. The device of claim 1, further comprising said rear wall being formed of a plurality of meshed rear wall wires.

12. The device of claim 1, further comprising said container door being spring-biased in said closed position of said container door.

13. The device of claim 1, further comprising said rear door being openable into said interior space.

14. The device of claim 1, further comprising said rear door being spring-biased in said closed position of said rear door.

15. The device of claim 1, further comprising said perimeter wall of said container having a pair of lateral portions, each said lateral portion extending from said rear end to said tow end, said perimeter wall having a top portion and a bottom portion, each of said top portion and said bottom portion extending from said rear end to said tow end and between said pair of lateral portions, said rear door being pivotably coupled at a top end of said rear door, said top end of said rear door facing said top portion of said container, said rear door being centered between said pair of lateral portions and between said top portion and said bottom portion.

16. The device of claim 1, further comprising said rear door being formed of a plurality of meshed rear door wires, said plurality of meshed rear door wires defining a plurality of rear door apertures, said rear door being configured for permitting water moving through said plurality of rear door apertures.

17. The device of claim 1, further comprising said flotation member being one of a pair of flotation members, each said flotation member having a pair of ends, each said flotation member being elongate between said pair of ends thereof, each said flotation member being cylindrical, each said flotation member being positioned adjacent to an associated lateral portion of said perimeter wall and said rear end of said container.

18. A towable live well device comprising:
a container,
said container tapering from a rear end to a tow end, said container having a perimeter wall extending from said rear end to said tow end, said container defining an interior space, said perimeter wall having a rear edge defining an opening to said interior space at said rear end, said container being constructed of a water-impermeable material wherein said container prevents water from entering said interior space through said perimeter wall, said perimeter wall having a pair of lateral portions, each said lateral portion extending from said rear end to said tow end, said perimeter wall having a top portion and a bottom portion, each of said top portion and said bottom portion extending from said rear end to said tow end and between said pair of lateral portions, said top portion having an outer surface facing away from said interior space,
each of said top portion and said bottom portion being arcuate, each of said top portion and said bottom portion having an interior surface facing said interior space, each said interior surface being concave, each said lateral portion being vertical;
a rear wall, said rear wall extending across said opening, said rear wall being formed of a plurality of meshed rear wall wires, said rear wall being configured for permitting a quantity of a water moving through said opening, said rear wall being configured for containing a fish in said interior space, said rear wall and said container cooperatively defining a live well;
a container door, said container door being coupled to said top portion of said perimeter wall, said container door having an open position and a closed position, said container door covering a container aperture when closed, said container door being spring-biased in said closed position of said container door, said container door being configured for preventing the fish from moving through said container aperture when closed, said container door being openable away from said top portion, said container door being pivotably coupled at a front end of said container door, said front end facing said tow end of said container, said container door having a back end opposite said front end of said container door, said container door having a main portion and a handle portion extending from said main portion to said back end of said container door, said main portion being circular, said container door being centered between said lateral portions of said perimeter wall;

a rear door, said rear door being coupled to said rear wall, said rear door covering a rear aperture when closed, said rear door being spring-biased in said closed position of said rear door, said rear door being configured for preventing the fish from moving through said rear aperture when closed, said rear door being openable into said interior space, said rear door being pivotably coupled at a top end of said rear door, said top end of said rear door facing said top portion of said container, said rear door being centered between said pair of lateral portions and between said top portion and said bottom portion, said rear door being formed of a plurality of meshed rear door wires, said plurality of meshed rear door wires defining a plurality of rear door apertures, said rear door being configured for permitting water moving through said plurality of rear door apertures;

a pair of flotation members, said pair of flotation members being coupled to said container, said pair of flotation members having a density less than a density of the water, said pair of flotation members being configured for floating said live well proximate a top side of the water, each said flotation member having a pair of ends, each said flotation member being elongate between said pair of ends thereof, each said flotation member being cylindrical, each said flotation member being positioned adjacent to an associated lateral portion of said perimeter wall and said rear end of said container;

a tow bracket, said tow bracket being coupled to said top portion of said perimeter wall at said tow end of said container, said tow bracket extending away from said tow end, said tow bracket having an annular portion, said tow bracket being configured for coupling to a vessel for towing of said live well by the vessel by threading a tow line coupled to the vessel through said annular portion and securely tying the tow line to said tow bracket;

a storage compartment, said storage compartment extending into said outer surface of said top portion of said perimeter wall, said storage compartment defining a recessed surface and a perimeter surface, said storage compartment being positioned between said container door and said rear end of said container, said storage compartment being rectangular, said storage compartment being centered between said pair of lateral portions of said perimeter wall, said storage compartment being configured for holding an item; and a pair of straps, said pair of straps being coupled to said top portion of said perimeter wall, each said strap extending across said storage compartment between an associated pair of opposing corners of a plurality of corners of said storage compartment, each said strap being elastic, said pair of straps being configured for elastically stretching across the item when the item is held within said storage compartment, thereby securing the item within said storage compartment.

\* \* \* \* \*